July 27, 1926.
J. F. CALDWELL
1,593,792
PLASTIC MOLDING MACHINE
Filed Nov. 17, 1925   3 Sheets-Sheet 1
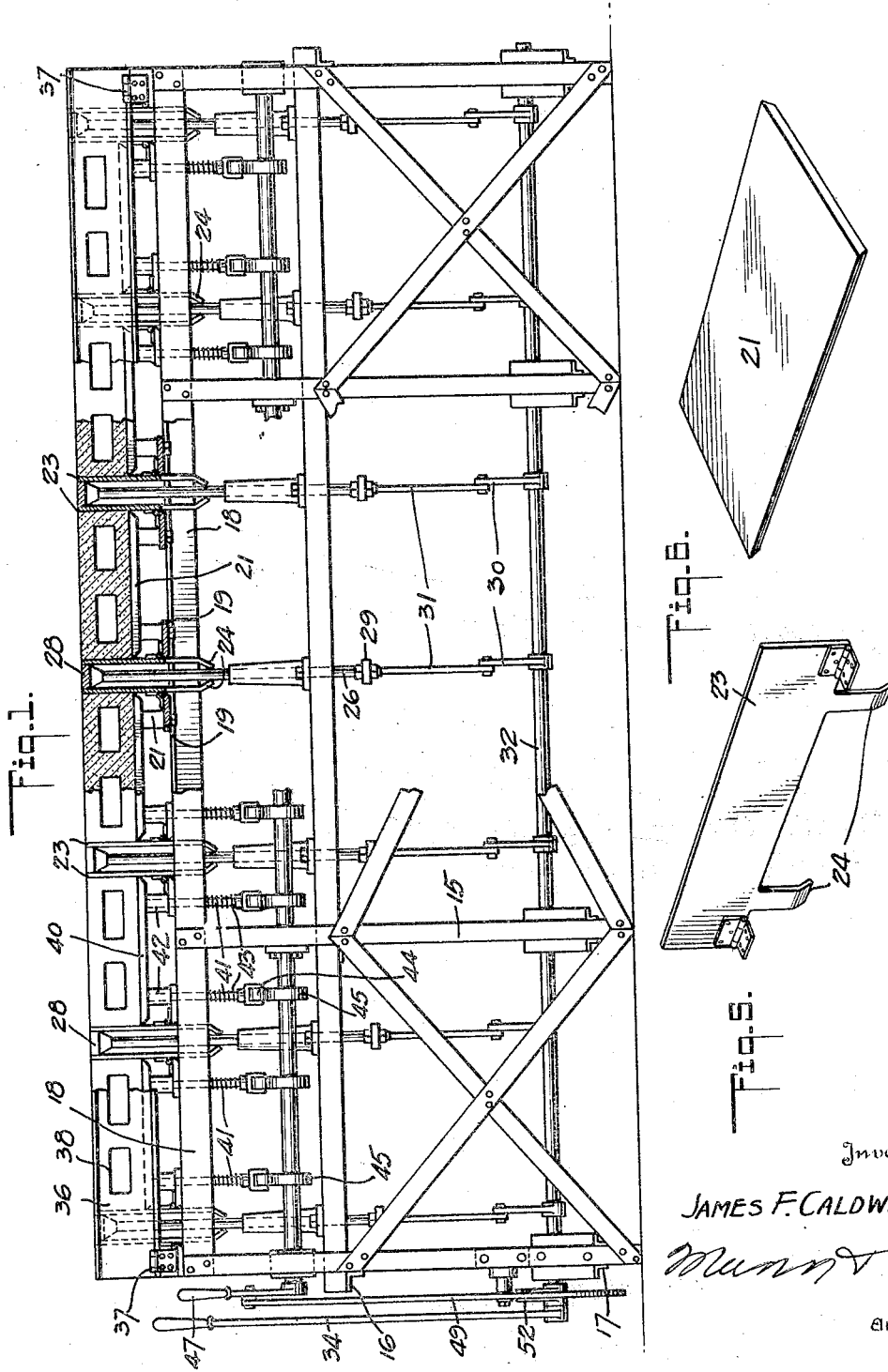
Inventor
JAMES F. CALDWELL
Attorney

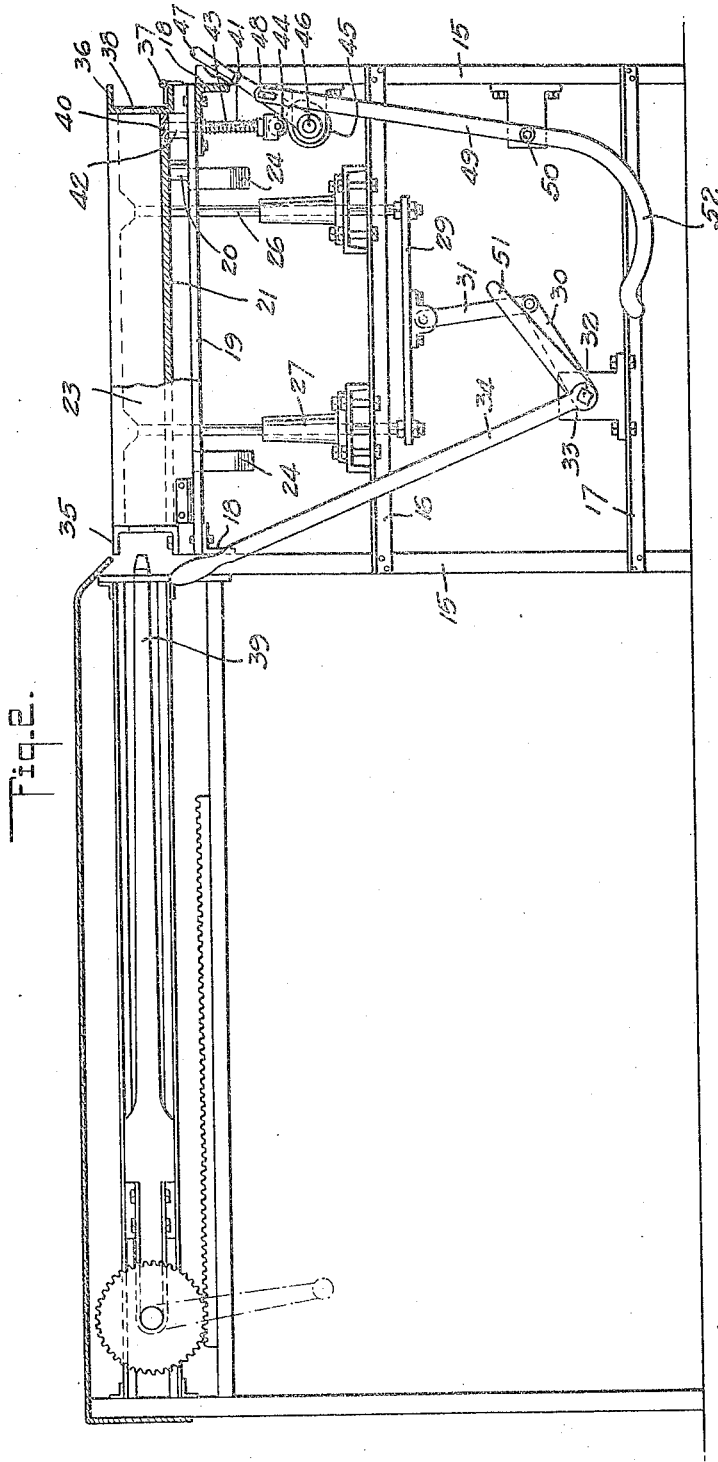

July 27, 1926.

J. F. CALDWELL

PLASTIC MOLDING MACHINE

Filed Nov. 17, 1925   3 Sheets-Sheet 3

1,593,792

Inventor

JAMES F. CALDWELL

By Munn & Co.

Attorney

Patented July 27, 1926.

1,593,792

UNITED STATES PATENT OFFICE.

JAMES F. CALDWELL, OF LOS ANGELES, CALIFORNIA.

PLASTIC MOLDING MACHINE.

Application filed November 17, 1925. Serial No. 69,680.

My invention relates to plastic molding machines of the character embodied in my co-pending application, Serial No. 757,525, filed December 22, 1924, designed for molding highly viscous and quickly setting plastic materials into blocks.

It is a purpose of my present invention to provide a plastic molding machine having a plurality of stationary molds each of which is capable of being readily expanded to facilitate quick removal of the molded article therefrom and in a manner to prevent possible adhesion of the plastic material to the walls of the mold and thereby permitting the molded article to be easily removed intact from the mold and the immediate refilling of the mold with other plastic material preparatory to molding other blocks without the necessity of first cleaning the mold.

It is also a purpose of my invention to provide a plastic molding machine of the above described character having means for elevating the block in each mold to free it from adhesion to the bottom of the mold, and mechanism operable to simultaneously expand all of the molds and to simultaneously but independently actuate all of the block-elevating means.

I will describe only one form of plastic molding machine embodying my invention and will then point out the novel features thereof in claims.

In the accompanying drawings,

Figure 1 is a view showing in side elevation and partly in section one form of plastic molding machine embodying my invention;

Figure 2 is a view showing in end elevation and partly in section the machine shown in Figure 1;

Figure 5 is a detail perspective view of one of the side plates of one of the molds;

Figure 6 is a detail perspective view of one of the bottom plates of one of the molds.

Similar reference characters refer to similar parts in each of the several views.

Referring specifically to the drawings, my invention, in its present embodiment, comprises a rectangular frame made up of angle bars and including uprights 15 and connected by transverse bars 16 and 17 and at their upper ends by a pair of angle bars 18 extending longitudinally of the frame. Upon these bars 18 a plurality of molds are supported and arranged in side by side relation so as to extend transversely of the frame. As all of the molds are identical in construction, a description of one will suffice for all.

Figure 3:
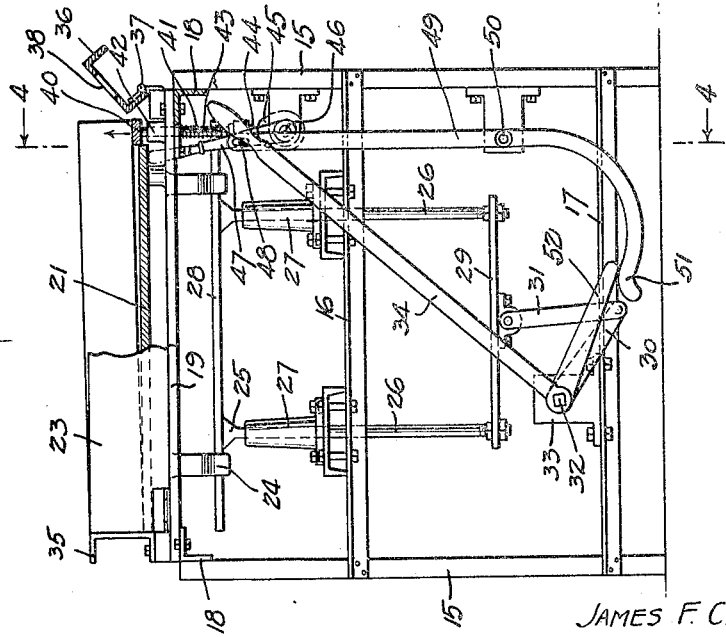
Figure 3 is a view similar to Figure 2 showing the other position which the machine is adapted to occupy for effecting an expansion of the molds.

Each mold in the present instance comprises a pair of flat cross bars 19 secured at their ends to the angle bars 18 and provided with studs or bosses 20, to which latter are secured a bottom plate 21 constituting the bottom of the mold. As clearly shown in Figure 4, the two bars 19 are spaced apart and as shown in Figure 3 each bar is provided with two studs 20 into which extend screw bolts 22 for securing the bottom plate 21 thereon.

Figure 4:
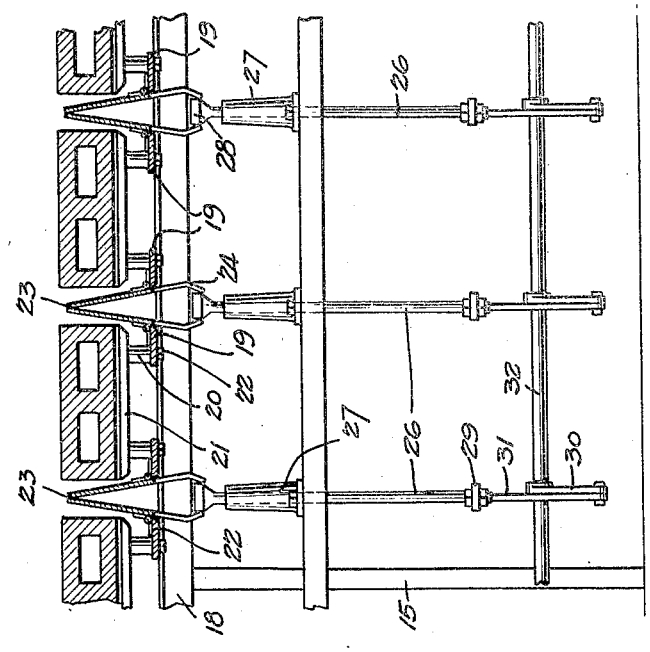
Figure 4 is a vertical sectional view taken on the line 4—4 of Figure 3.

The sides of the mold are formed by two plates 23 hinged at two points to the cross bars 19 so as to occupy a perpendicular block-forming position, as shown in Figure 1, or an expanded position, as shown in Figure 4, in which the plates are swung outwardly to an inclined position to permit the ready removal of the block therefrom. Each side plate 23, as shown in Figure 5, is provided with depending cam extensions 24, the lower ends of which are flared outwardly for engagement with a pair of heads 25 formed on the upper ends of rods 26 movable vertically in guides 27 secured to the cross bars 16. As shown in Figure 3, the heads 25 do not actually engage the flared ends of the cam extensions 24, but a cross head 28 is secured to the heads 25 to have operative engagement with the flared ends. The two rods 26 are connected at their lower ends by a yoke 29, and the latter is pivotally connected to an arm 30 through a link 31, the arm 30 being fixed to a shaft 32 journaled in suitable bearings 33 carried by the cross bars 17.

The shaft 32 is adapted to be rotated through the medium of a lever 34 secured to the shaft and arranged at one end of the machine as shown in Figure 1, and upon rotation of the shaft the several arms 30 for each pair of rods 26 are actuated to impart vertical movement to the rods and, hence, to the heads 25 and the cross heads 28, whereby the cross heads 28 will co-operate with the cam extensions 24 to swing the side plates 23 from perpendicular to inclined position, or vice versa. It will be noted, as shown in Figure 4, that there is one cross head for the adjacent side plates or any two adjacent molds, and that this single cross head operates to simultaneously move the two side plates and retain the same in perpendicular or inclined position.

The end walls of the several molds are formed by the provision of a pair of channel irons 35 and 36 extending longitudinally of the frame and transversely of the ends of the molds. The channel iron 35 is fixedly secured to the frame, but the channel iron 36 is movably supported thereon by means of hinges 37 to occupy an upright position, as shown in Figure 2, an inclined position as shown in Figure 3. In the present instance, I have shown the channel bars 35 and 36 formed at intervals corresponding to the molds with openings 38 through which cores 39 can be extended after the plastic material within the molds has set and to cooperate with the molds in forming hollow blocks.

The construction, mounting and operation of the cores 39 form no part of the present invention and have been fully set forth in my co-pending application heretofore referred to.

By reference to Figures 2 and 3, it will be seen that one end of each bottom plate 21 terminates short of channel iron 36 in order to accommodate therebetween the block elevating device 40 in the form of a flat bar co-extensive in width with the bottom plate and mounted for vertical movement to occupy a low position as shown in Figure 2 or an elevated position as shown in Figure 3, in which it is adapted to engage the projecting ends of the molded block and to thus slightly tilt the block in the mold in order to loosen the bottom of the block from the plate 21 and thereby prevent possible adhesion of the block to the bottom plate. Each elevating device is secured to the upper ends of a pair of rods 41 movable in sleeves 42 secured to the cross bars 19, the rods being normally urged downwardly by means of springs 43 and having their lower ends provided with rollers 44 engaged by cams 45 secured to a shaft 46 common to all of the cams for all of the rods of the several molds. As shown in Figures 1 and 3, one end of the shaft 46 is provided with a lever 47 which is adapted to be manually gripped to rotate the shaft 46 in actuating the cams 45. This lever is operatively connected through a pin-and-slot connection 48 to a lever 49, the latter being fulcrumed at the point indicated at 50 and having a curved extension 51 engageable with an arm 52 secured to the shaft 33.

The operation of the machine is as follows: In the normal position of each mold, the side plates 23 occupy perpendicular positions, the channel bar 36 a perpendicular position, and the elevating device a lowered position in which it is flush with the bottom plate 21, all as normally shown in Figure 2. In order that the side plates 23 and the elevating device may occupy these positions, the mechanisms for operating the latter occupy the positions shown in Figure 2. After the several molds have been filled with plastic material, and the latter are allowed to set, the side plates of all of the molds can be simultaneously moved to expanded position, as shown in Figure 4, by swinging the lever 34 from the position shown in Figure 2 to that shown in Figure 3, wherein the arms 30 are lowered to impart a corresponding movement to the several cross heads 28, and as the latter move downwardly they engage the flared ends of the cam extensions 24, thereby expanding the latter and thus moving the side plates to inclined position. As the lever 34 reaches the end of its movement, the arm 52 engages the curved extension 51 of the lever 49, thus moving the upper end of the lever inwardly and thereby imparting a corresponding movement to the lever 47 to rotate the shaft 46 and thus actuate the cams 45 to elevate the rods 41 against the tension of the springs 43 to lift all of the devices 40 and thereby slightly tilt the several blocks and thus loosen the same from the bottom plates 21 of the molds. It is to be understood that before the elevating devices can be lifted, it is necessary that the channel bar 36 be swung to expanded position, as shown in Figure 3.

From the foregoing operation, it will be manifest that the several molds can be simultaneously moved to expanded position and the blocks of the molds slightly tilted to prevent adhesion of the plastic material to the bottom of the molds. In handling plastic materials which quickly set, it is vital to the successful molding of the material to expand the molds almost immediately following the introduction of the material into the molds, in order that adhesion of the material to the walls of the molds may be prevented to eliminate the necessity of cleaning the molds after each molding operation, as well as to permit the plastic molding of the block. By the provision of the mechanism for simultaneously expanding all of the molds, the blocks immediately upon setting of the plastic material can be loosened from all the walls of the molds, thus preventing adhesion of the material and the perfect molding of the blocks.

It will be understood that in order to restore the sides of the molds to perpendicular position preparatory to a second molding operation, the lever 34 is returned to the position shown in Figure 2, whereby the several cross heads 28 are elevated between the side plates so as to engage the latter and move the same into perpendicular position. The several elevating devices 40 can be lowered to normal position by manual operation of the lever 47, as will be understood.

Although I have herein shown and described only one form of molding machine embodying my invention, it is to be understood that various changes and modifications may be made therein without departing from the spirit of the invention and the spirit and scope of the appended claims.

I claim as my invention:

1. A molding machine comprising a plurality of molds each having a bottom with a vertically movable portion, outwardly movable sides, and ends one of which is outwardly movable.

2. A molding machine as embodied in claim 1 wherein means is provided for simultaneously elevating the vertically movable portions of all of the molds.

3. A molding machine as embodied in claim 1 wherein means is provided for simultaneously elevating the vertically movable portions of all of the molds and returning the same to lowered positions.

4. A molding machine comprising a plurality of molds each having a bottom with a vertically movable portion, outwardly movable sides, ends one of which is outwardly movable, means for simultaneously elevating the vertically movable portions of all of the molds, and means for simultaneously moving all the sides outwardly.

5. A molding machine comprising a plurality of molds each having a bottom with a vertically movable portion, outwardly movable sides, ends one of which is outwardly movable, and means for simultaneously moving all of the sides outwardly or inwardly.

6. A molding machine comprising a plurality of molds each having a bottom with a vertically movable portion, outwardly movable sides, and ends one of which is outwardly movable, means for urging the vertically movable portions to a lowered position in which they are flush with the bottom, means for simultaneously elevating the vertically movable portions of all of the molds, against the action of said urging means, and means for simultaneously moving all of the sides outwardly and returning the same to normal position.

7. A molding machine as embodied in claim 6 wherein the second and third means are interconnected to operate together.

8. A molding machine as embodied in claim 6 wherein the second and third means are interconnected to operate together upon operation of the third means.

9. A plastic mold comprising sides movable outwardly, ends one of which is movable outwardly, a bottom terminating short of one end of the sides so that a molded block therein will project from one end of the bottom, and an elevating device normally flush with the bottom and movable vertically to engage the projecting end of the mold for tilting the latter within the mold to prevent adhesion of the block to the bottom of the mold.

10. In a block molding machine, a plurality of molds arranged in side by side relation and having sides movable outwardly from a perpendicular position, and means interposed between adjacent molds and movable vertically to move the sides outwardly from perpendicular position and for returning the sides to perpendicular position.

11. In a block molding machine, a plurality of molds arranged in side by side relation and having sides movable outwardly from a perpendicular position, extensions on the sides, and members movable vertically between adjacent molds to engage the extensions of adjacent sides to move the latter outwardly from perpendicular position.

12. A molding machine as embodied in claim 10 wherein said means comprises a plurality of bars, vertically movable rods secured to the bars, yokes connecting the rods in pairs, and a shaft operatively connected to all of the yokes for lowering or elevating the latter to impart a corresponding movement to all of the rods and the cross heads.

JAMES F. CALDWELL.